Aug. 28, 1956    H. W. GREER ET AL    2,760,321
DEVICE FOR APPLYING BANDS TO CONTAINERS
Filed Sept. 24, 1951    14 Sheets-Sheet 1

INVENTORS:
HENRY W. GREER
ROBERT W. HOMPE
GEORGE J. PINEL
BY
ATTORNEYS

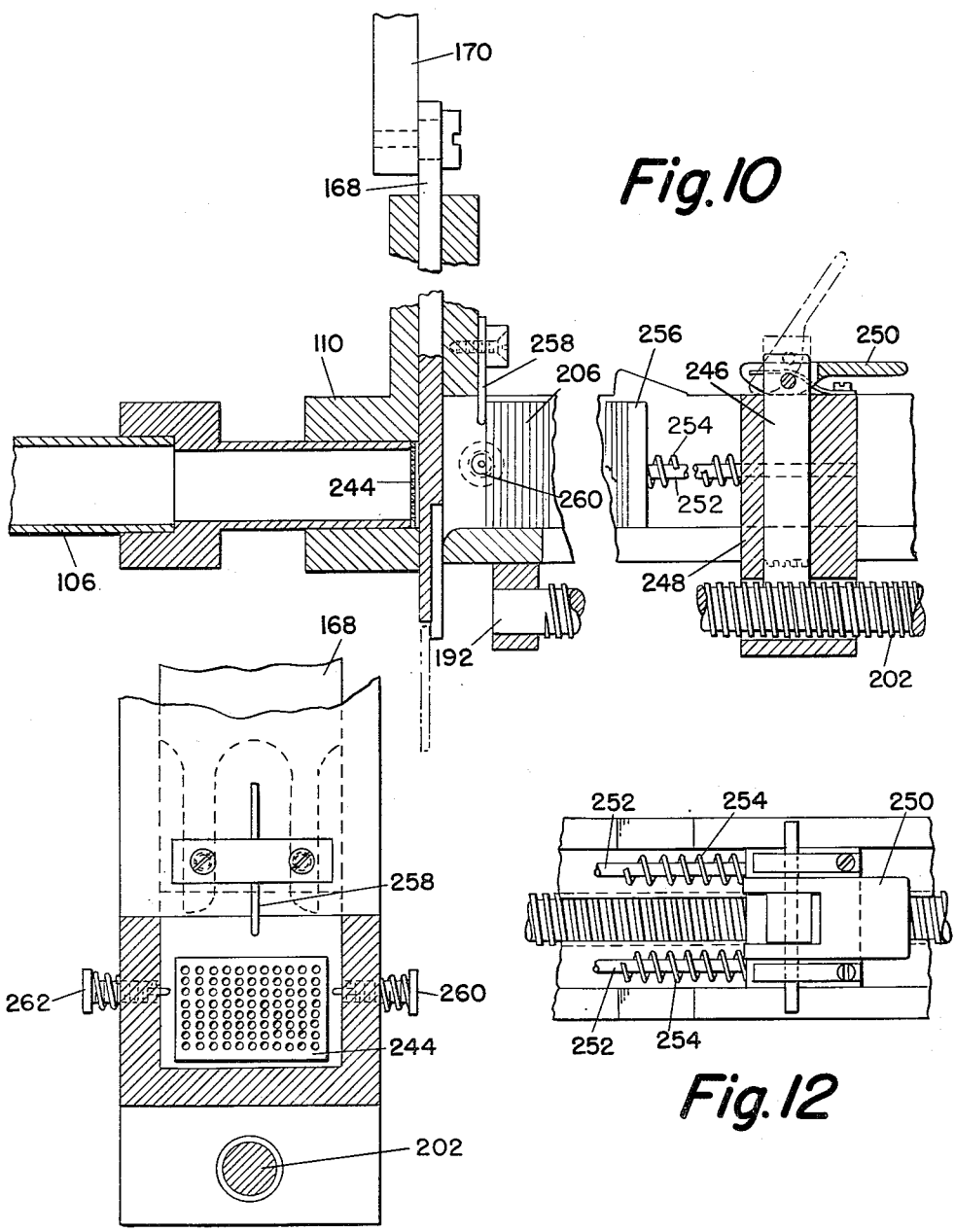

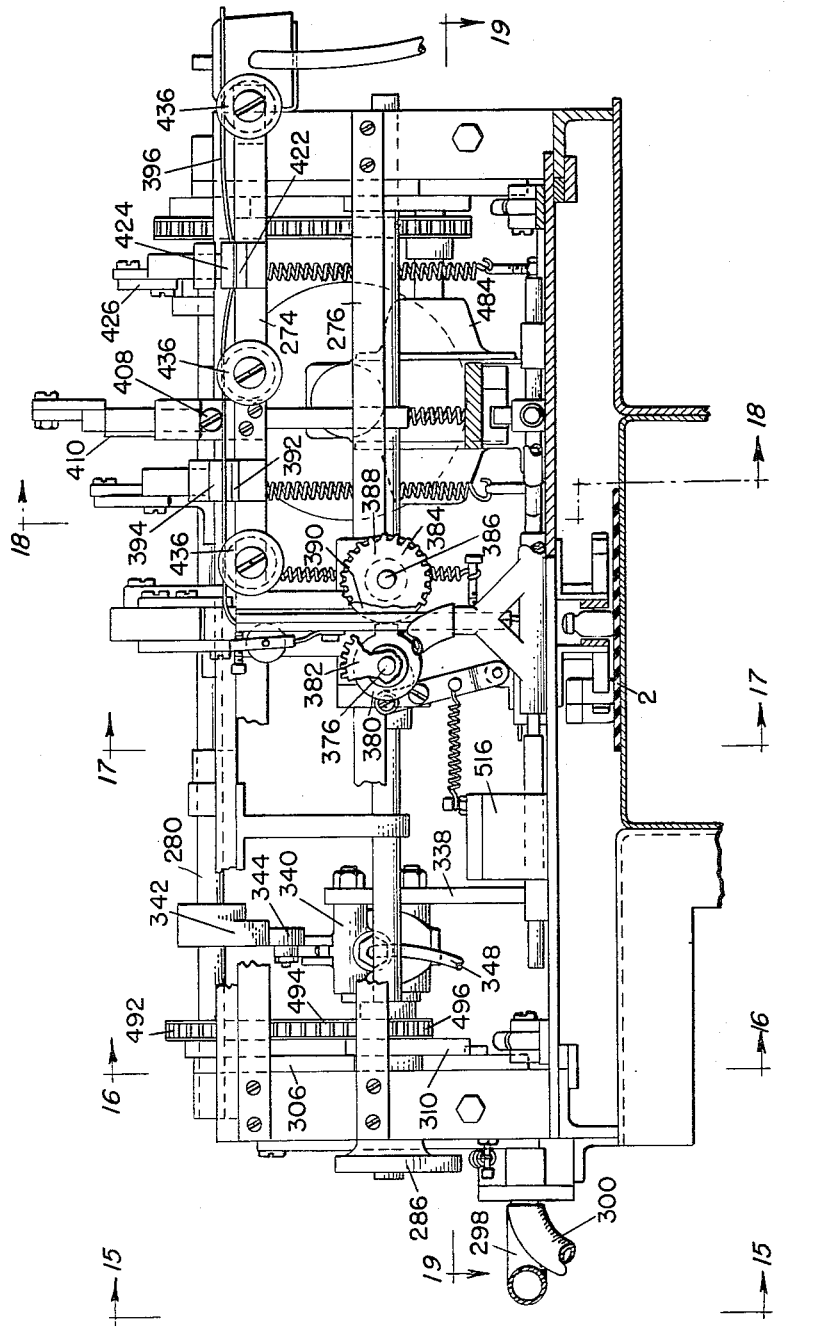

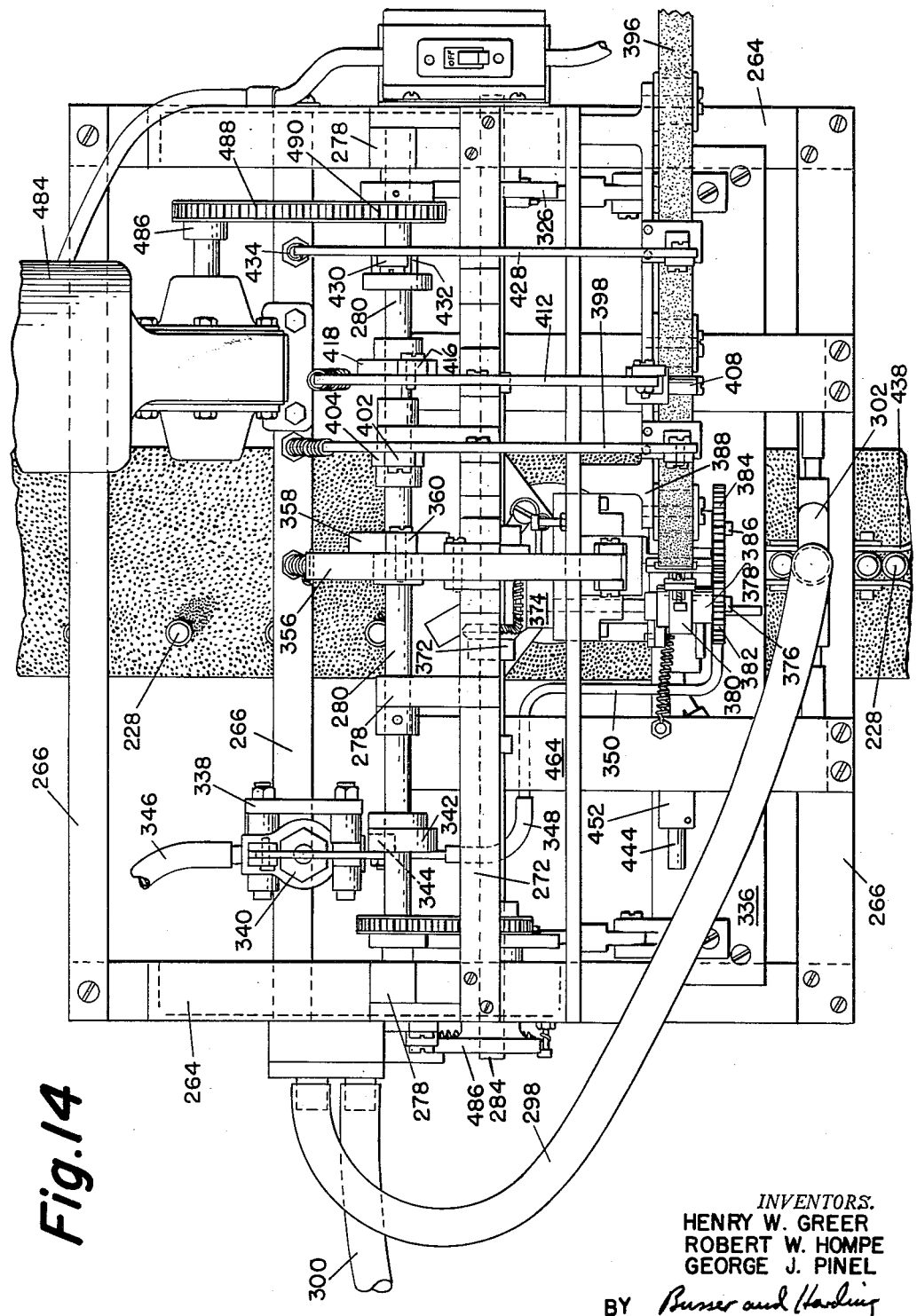

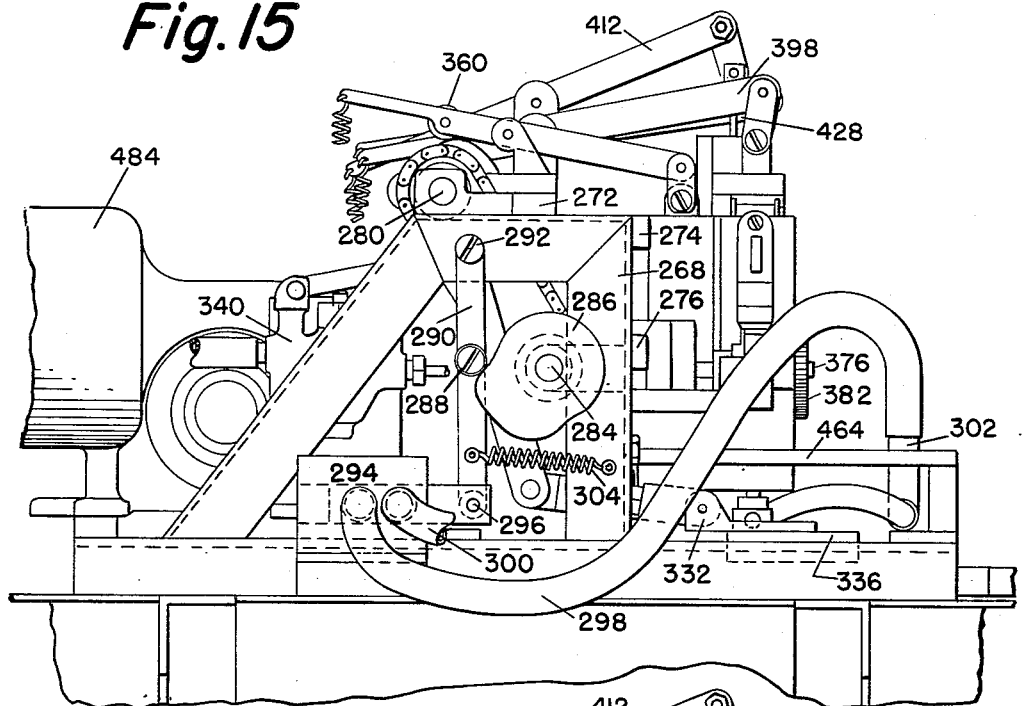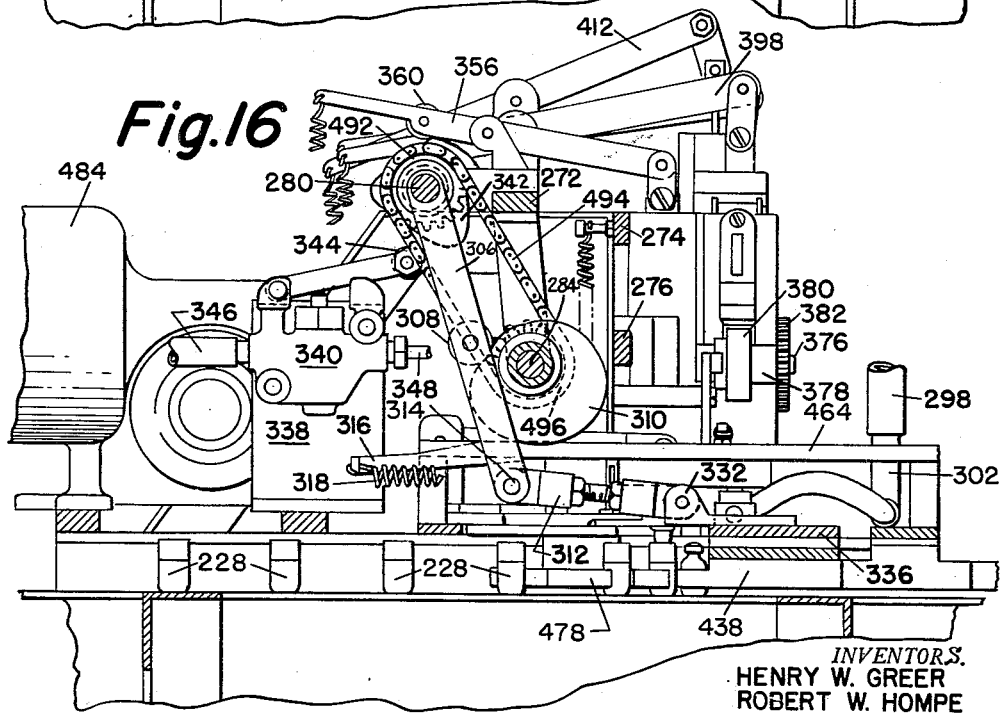

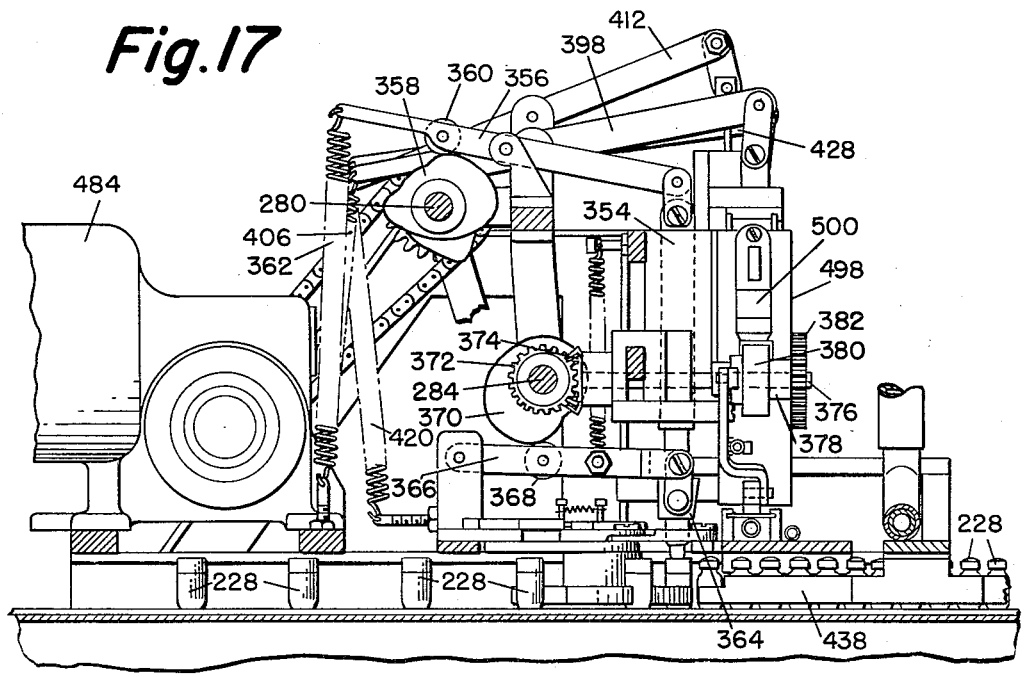
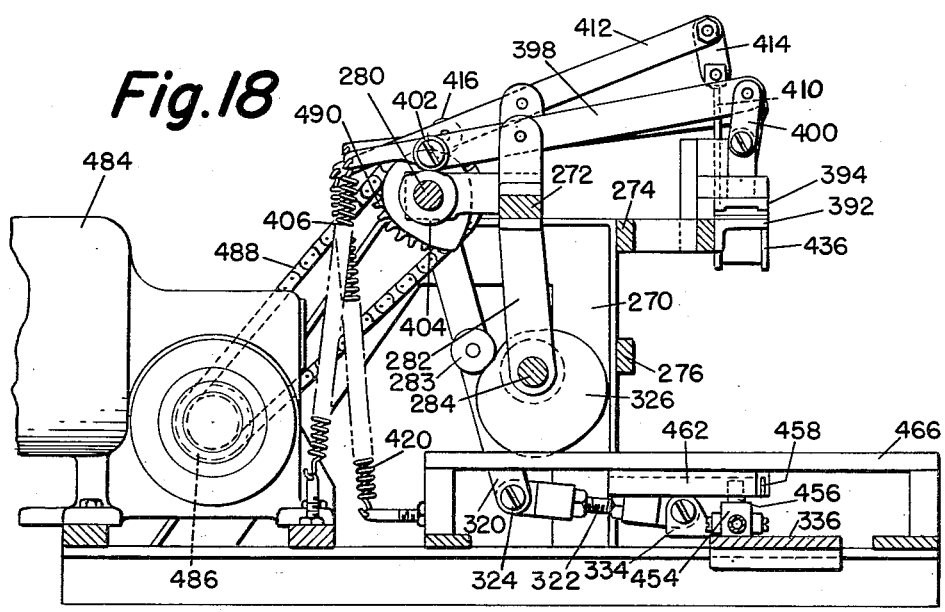

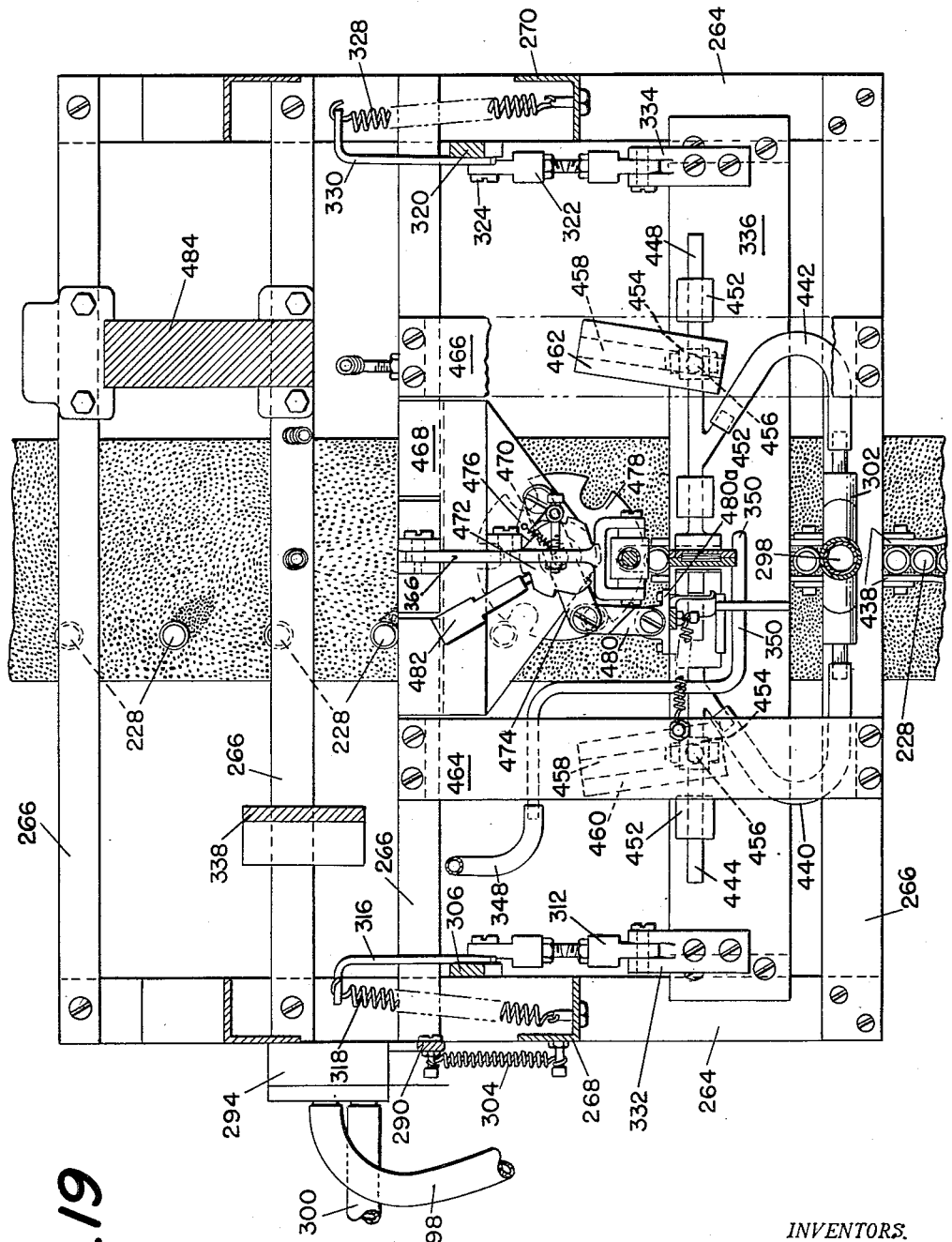

Aug. 28, 1956 H. W. GREER ET AL 2,760,321
DEVICE FOR APPLYING BANDS TO CONTAINERS
Filed Sept. 24, 1951 14 Sheets-Sheet 13

INVENTORS.
HENRY W. GREER
ROBERT W. HOMPE
GEORGE J. PINEL.
BY Busser and Harding
ATTORNEYS.

Inventors
Henry W. Greer
Robert W. Hompe
George J. Pinel

United States Patent Office 2,760,321
Patented Aug. 28, 1956

2,760,321

DEVICE FOR APPLYING BANDS TO CONTAINERS

Henry W. Greer, Philadelphia, Robert W. Hompe, Ithan, and George J. Pinel, Philadelphia, Pa., assignors to Smith, Kline & French Laboratories, Philadelphia, Pa., a corporation of Pennsylvania Application September 24, 1951, Serial No. 248,078

17 Claims. (Cl. 53—292)

This invention relates to a device for applying bands to containers. More specifically, this invention relates to a device for applying bands of regenerated cellulose to the tops of bottles, to seal the cap on the bottle.

The present invention has for objects the provision of improved apparatus operative automatically to apply seamless, tubular, open-ended bands to bottle necks, in particular to sever successive lengths of band-forming material from a supply of tubing and to open each such length after its severance from the supply and to slip the open band over the neck of a bottle positioned to receive it; to provide improved and effective means for opening the band and for slipping it over the bottle neck; to provide simple and effective means for actuating the band-forming, opening and applying instrumentalities in accurately timed relation; to provide improved means for positioning a bottle, advanced by conveyor means, in readiness to receive a band, and to provide band-applying means capable of operation at high speed. Other and further objects and advantages of the invention will be pointed out in the following more detailed description and by reference to the accompanying drawings wherein:

Figure 1 discloses a front view of one embodiment of the invention;

Figure 2 is a top view of the embodiment of the invention shown in Figure 1;

Figure 3 is a view taken on line 3—3 of Figure 2;
Figure 4 is a view taken on line 4—4 of Figure 2;
Figure 5 is a view taken on line 5—5 of Figure 2;
Figure 6 is a view taken on line 6—6 of Figure 2;
Figure 7 is a view taken on line 7—7 of Figure 2;
Figure 8 is a view taken on line 8—8 of Figure 2;
Figure 9 is a view taken on line 9—9 of Figure 1;
Figure 10 is an enlarged view of the magazine feed employed in the embodiment shown in Figure 1;
Figure 11 is an enlarged view of the vacuum device employed to remove an individual band from the magazine;
Figure 12 is an enlarged view of the feeding mechanism employed to advance the bands toward the removal mechanism;
Figure 13 is a front view of a modified form of the invention;
Figure 14 is a top view of the embodiment of the invention disclosed in Figure 13;
Figure 15 is a view taken on line 15—15 of Figure 13;
Figure 16 is a view taken on line 16—16 of Figure 13;
Figure 17 is a view taken on line 17—17 of Figure 13;
Figure 18 is a view taken on line 18—18 of Figure 13;
Figure 19 is a view taken on line 19—19 of Figure 13;
Figure 20 is an enlarged view of the continuous tube feeding mechanism;
Figure 21 is an enlarged view of the knife and band opening mechanism taken on line 21—21 of Figure 20.

Figure 1:
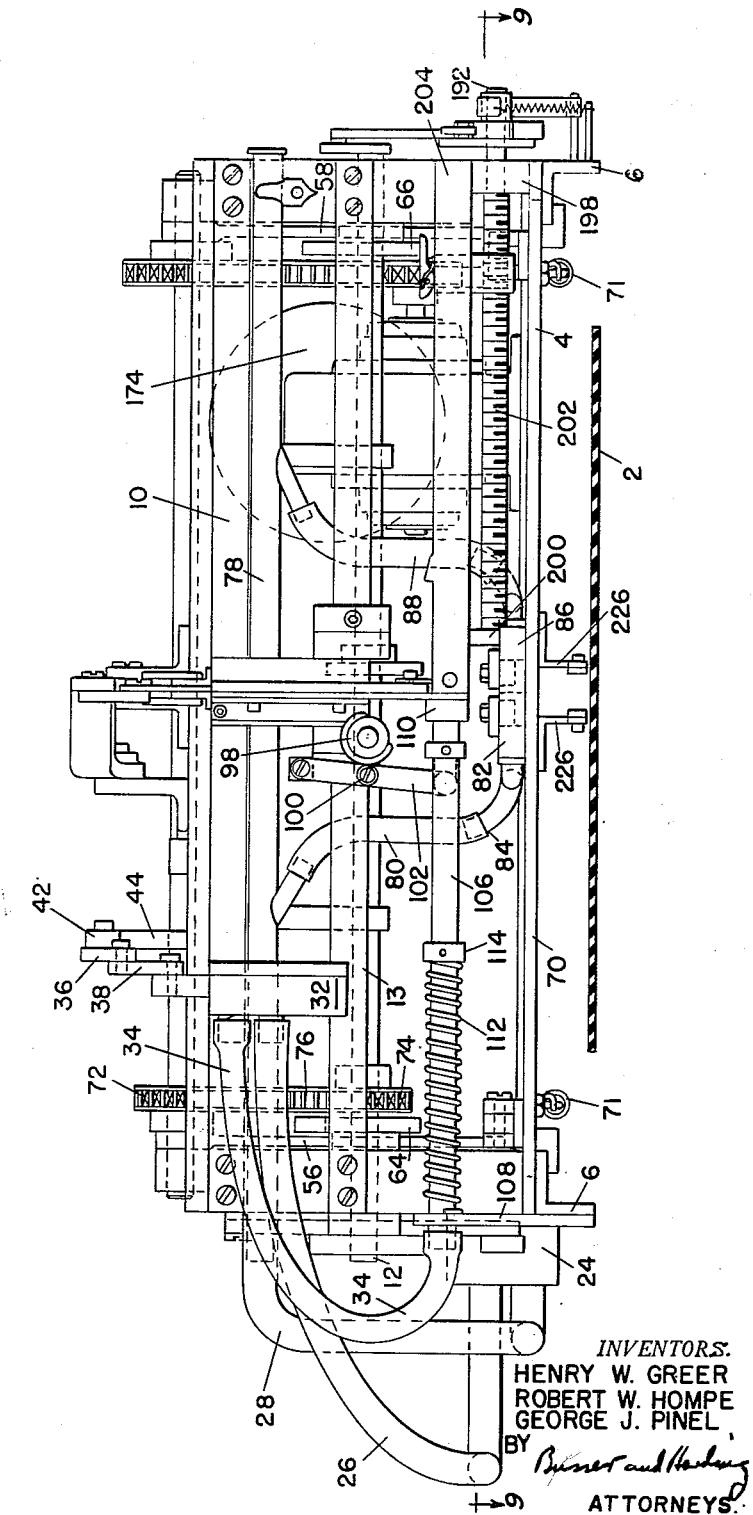

Briefly stated, the apparatus of the present invention comprises means for advancing the end portion of a flattened tube of band-forming material between two relatively movable suction cups which, at this instant, are separated but which are then moved toward each other to contact the opposite flat surfaces of the tube. Suction is then established at the cups so that they grip the tube, and, while it is so gripped between the cups, a knife severs from the tube a sufficient length to form a single band. The cups, with the severed length of material gripped between them, now move bodily toward a band-applying station at which a bottle has been placed in position to receive the band. As the suction cups thus move toward the band-applying or transfer station they gradually separate thereby partially opening the band to approximately but not accurately circular shape. While the cups thus hold the partially open band in transfer position above the bottle neck, a cylindrical expander sleeve, coaxial with the bottle neck, is moved axially into the partially open band thereby opening the band to a true circular shape. Suction at the cups is then broken and the cups return to their initial position, while a stripper sleeve is being moved axially of the expander sleeve so as to slide the band from off the latter and onto the bottle neck.

For driving the machine there is provided an electric motor 174 (Fig. 4) whose shaft carries a sprocket wheel driving a sprocket chain 178 which is trained about a sprocket on the horizontal shaft 46. A second sprocket on the shaft 46 drives a sprocket chain 76 which engages a sprocket wheel on a horizontal shaft 12 parallel to the shaft 46. This shaft 12 drives a third horizontal shaft 94, whose axis is at right angles to that of the shaft 12, by means of appropriate beveled gears. The shafts 46, 12 and 94 carry cams for actuating the various band-manipulating instrumentalities in accurately timed relation. In order to speed up the operation, each band is cut from a length of tubing and transferred to an applying station at which a bottle is supported in readiness to receive it and at which the band is opened out and slipped onto the bottle neck, the parts being so timed that while one band is being applied another is being cut off from the supply.

Referring specifically to Figure 1, the device is shown mounted by any suitable means above a conveyor 2.

Figure 2:
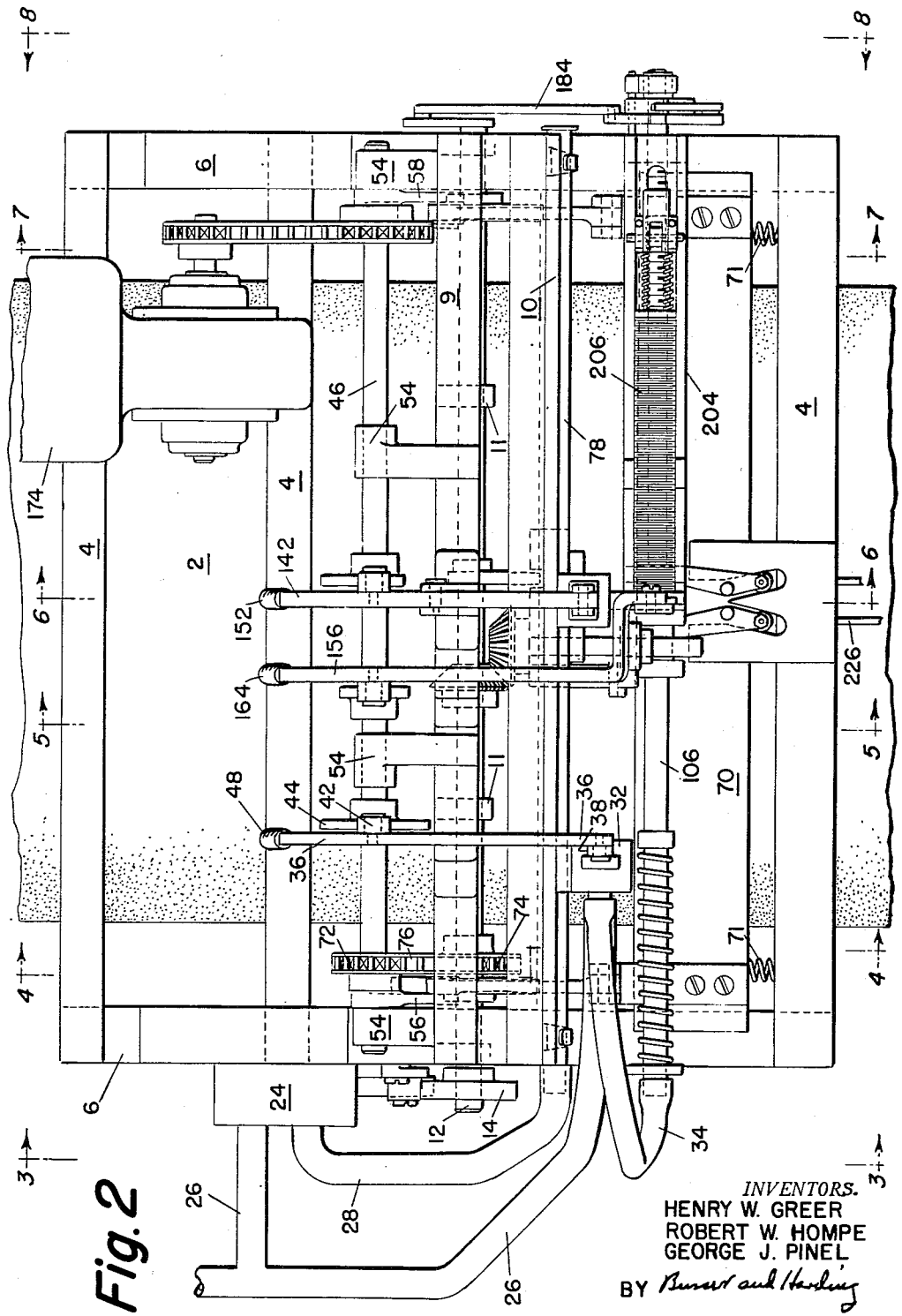

As best shown in Figure 2, the device is mounted on a rectangular frame having members 4 lying transversely of conveyor 2 and members 6 lying parallel to the run of the conveyor.

Figure 3:
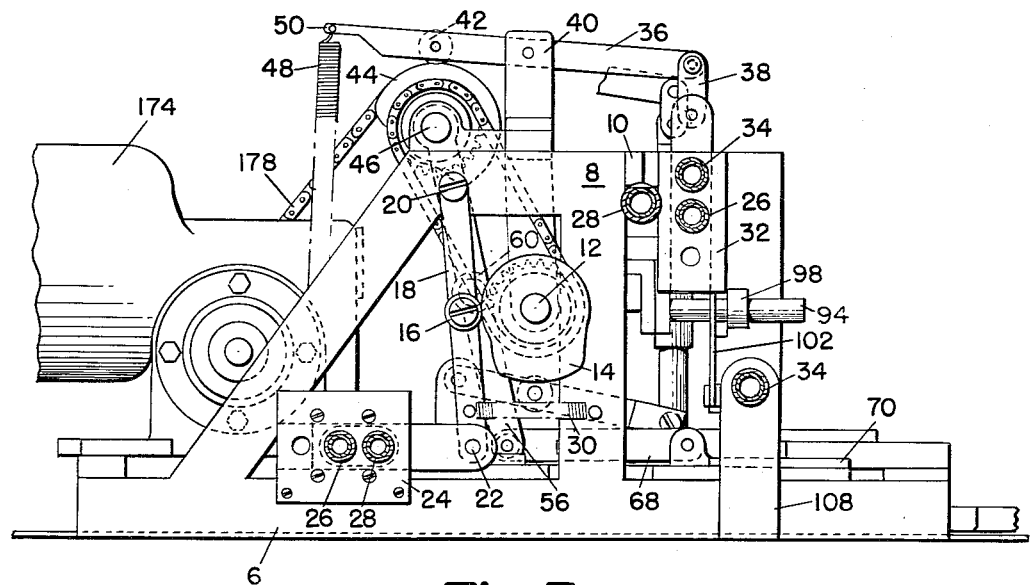
Figure 8:
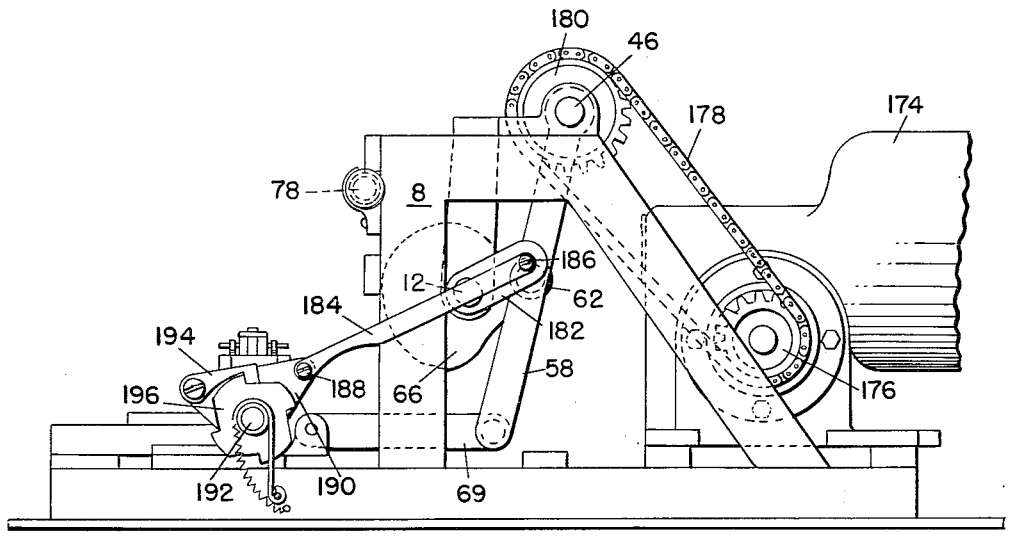

Referring specifically to Figures 3 and 8, members 6 have a pair of integral upstanding frames 8 mounted thereon, said frames 8 supporting cross-members 9, 10 and 13, said cross-member 9 supporting a plurality of shaft hangers 11 in which is journalled shaft 12.

Figure 9:
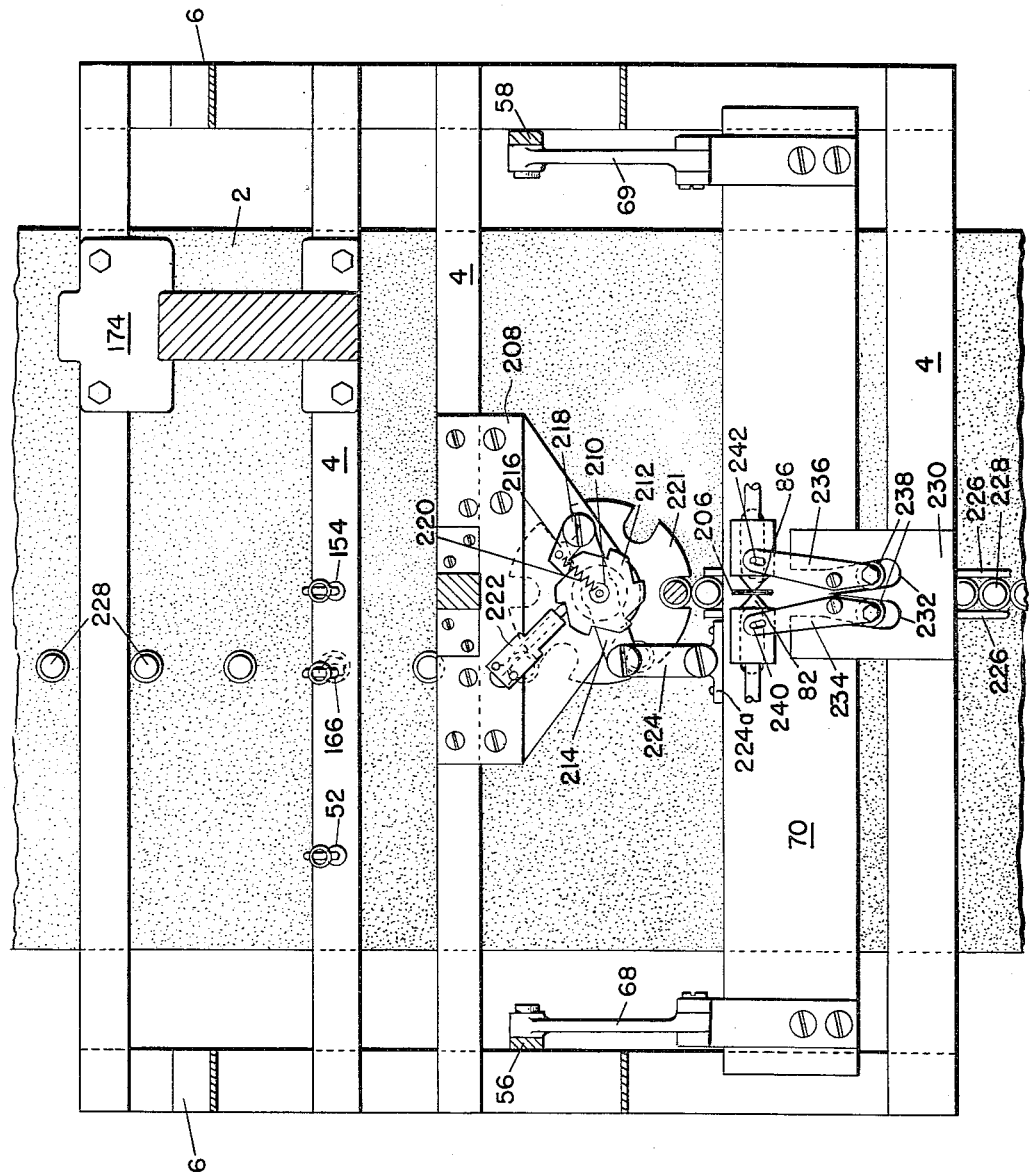

Referring specifically to Figure 3, shaft 12 has a cam 14 mounted thereon, said cam engaging cam follower 16 mounted on lever 18, said lever being pivoted at its upper end to frame 8, as shown at 20. Lever 18 is pivoted at its lower end, as shown at 22, to a vacuum slide valve 24 having vacuum lines 26 and 28 affixed thereto. Vacuum line 26, at its opposite end, is connected to a conventional vacuum pump. Vacuum slide valve 24 is normally biased toward the right, as viewed in Figure 3, by a spring 30 which is attached to lever 18 at one end and to frame 8 at its opposite end. Secured to the front right-hand side of cross-member 10, as viewed in Figure 3, is valve 32 which controls vacuum lines 34 and 26. Valve 32 is of the slide type and is actuated by a lever 36 which is connected to slide valve 32 by connecting link 38. Lever 36 is rotatably supported on a bracket 40, said bracket being mounted on cross-member 9. Lever 36 has a cam follower 42 mounted thereon, said cam follower engaging a cam 44 mounted on cross shaft 46. Cam follower 42 is kept in engagement with cam 44 by means of tension spring 48 which is secured to the left-hand end of lever 36, as viewed in Figure 3, as shown at 50, and is secured at its lower end to cross-member 4 at 52, as shown in Figure 9.

Shaft 46 is journalled in shaft hangers 54, as best seen in Figure 2.

Figure 7:
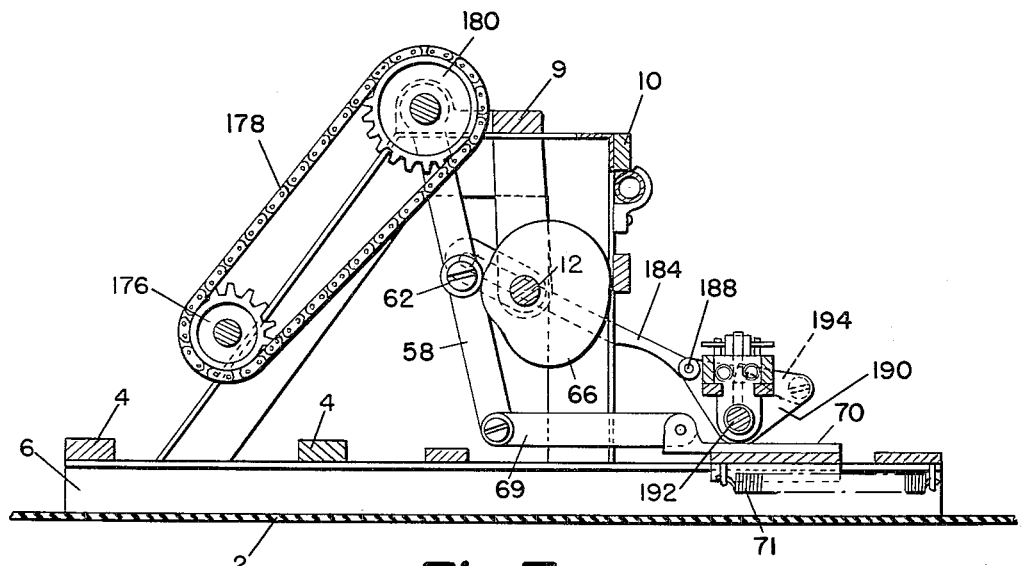

Referring specifically to Figures 3 and 8, levers 56 and 58 are rotatably mounted on shaft 46. Intermediate the ends of levers 56 and 58 are cam followers 60 and 62, respectively. Cam followers 60 and 62 engage cams 64 and 66, respectively, said cams being mounted on cross shaft 12. Pivoted to levers 56 and 58 at their lower ends, respectively, are connecting links 68 and 69, said connecting links being pivoted at their opopsite ends to slidable plate 70. Slidable plate 70 is biased to the right, as viewed in Figures 3 and 7, by tension springs 71.

Figure 4:
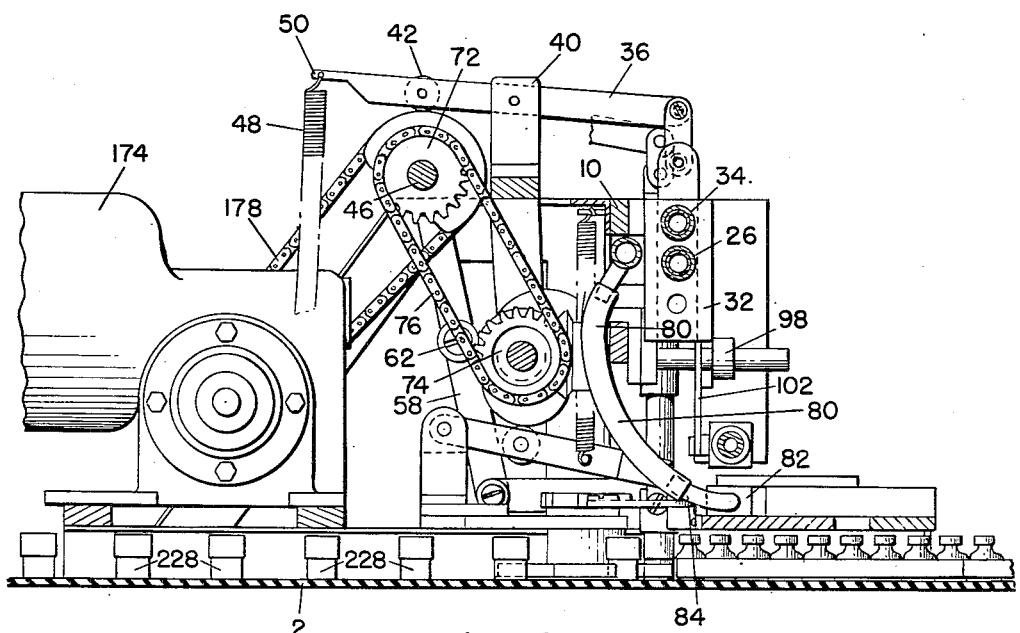

Referring specifically to Figure 4, shaft 46 is provided with a sprocket 72 thereon, said sprocket driving sprocket 74, mounted on shaft 12, through chain 76. Vacuum line 78 is provided beneath cross-member 10, and has vacuum line 28 connected thereto at the left-hand end thereof, as viewed in Figure 2. Flexible vacuum line 80 is connected at its upper end line 78 and to vacuum band-opening cup 82 at 84 (Fig. 1). Vacuum band-opening cup 86 is also connected to a vacuum line 78, through flexible line 88, as best seen in Figure 1.

Figure 5:
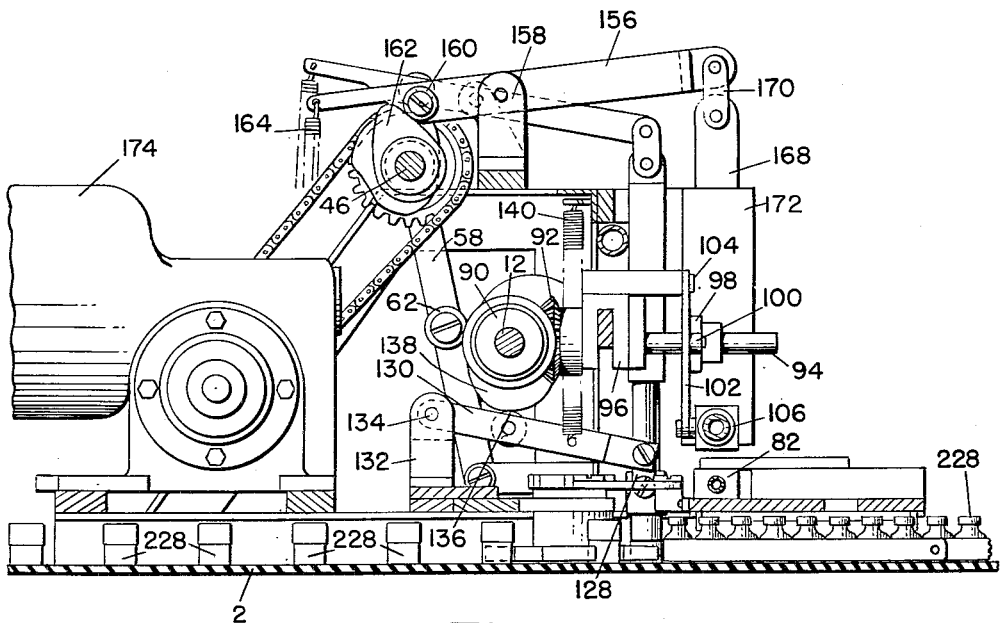

Referring specifically to Figure 5, shaft 12 has bevel gear 90 mounted thereon, said bevel gear 90 meshing with bevel gear 92. Bevel gear 92 is mounted on the end of shaft 94, said shaft 94 being journalled in bracket 96. Mounted on shaft 94 is cam 98 engaging cam follower 100 (Fig. 1), said cam follower 100 being mounted on lever 102. Lever 102 is pivoted at its upper end to bracket 96 by pin 104, and is pivoted at its lower end to hollow rod 106, as best seen in Figure 1. Hollow rod 106 is slidably supported in bracket 108 at its left-hand end, as viewed in Figure 1, and is supported at its right-hand end by sleeve 110. Hollow rod 106 has a compression spring 112 mounted on the left-hand end thereof, as viewed in Figure 1, said compression spring abutting against collar 114 and biasing hollow rod 106 toward the right, as viewed in Figure 1.

Figure 6:
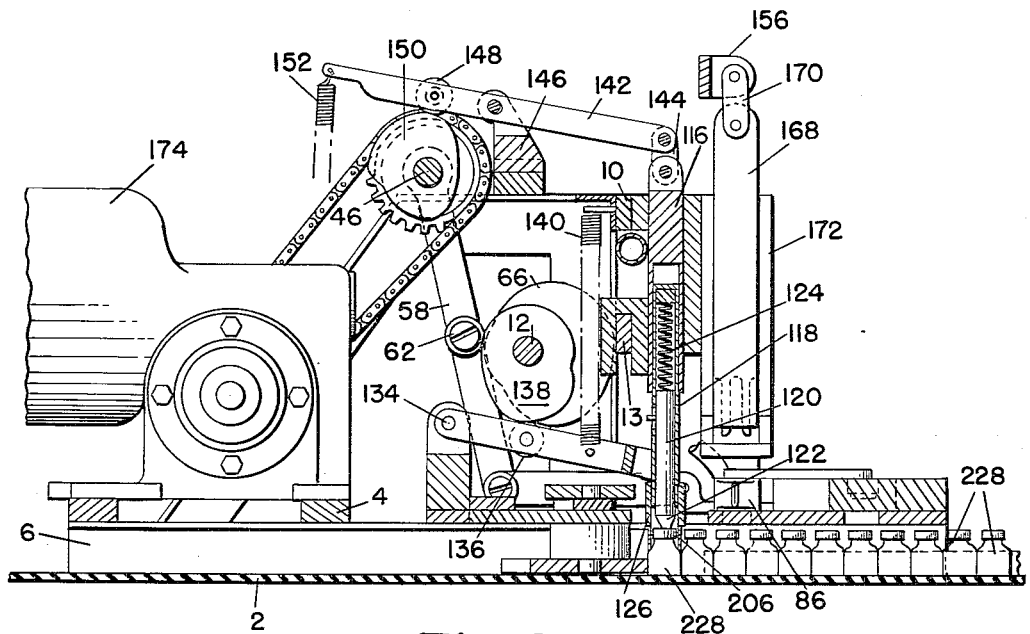

Transfer mechanism for transferring the band from the suction cups to the bottle is shown more particularly in Figs. 5 and 6. This transfer means is supported by the transverse members 10 and 13, and comprises a vertically reciprocable plunger 116 which is coaxial with the bottle neck when the bottle occupies the band-receiving position. The lower part of the plunger is tubular. An expander sleeve 118 slides within the tubular lower portion of the plunger 116. A rod 120 slides within the sleeve 118, being urged downwardly by a compression spring 124. The lower end of the rod 124 is tapered, the extreme or bottom surface of the rod being flat and horizontal, and the rod is connected to the sleeve 110 by a pin and slot connection (not shown). A stripper sleeve 126 is mounted to slide on the lower end portion of the expander sleeve 118. One end of a link 128 is pivotally attached to the stripper sleeve 126, the opposite end of the link being pivotally connected to a lever 130 which has a fork at its right-hand end, as viewed in Figures 5 and 6, and having a corresponding connecting link 128 on the opposite side of the sleeve 126, as viewed in Figure 5, the other end of said lever being pivoted to bracket 132, as shown at 134. Lever 130 has a cam follower 136 mounted thereon, said cam follower engaging cam 138 mounted on shaft 12. Lever 130 is biased upwardly by tension spring 140. Rod 116 is reciprocated by lever 142, said lever being joined to rod 116 through connecting link 144. Lever 142 is pivoted to bracket 146, said bracket 146 being mounted on cross-member 9. Mounted on lever 142 is cam follower 148, which engages cam 150 mounted on shaft 46. Cam follower 148 is kept in engagement with cam 150 by tension spring 152, said tension spring 152 being secured to cross-member 4 at its lower end, as shown at 154 in Figure 9.

As best shown in Figure 5, lever 156 is fulcrumed on bracket 158, said bracket being secured to cross-member 9. Mounted on lever 156 is cam follower 160, which engages cam 162 mounted on shaft 46. Cam follower 160 is kept in engagement with cam 162 by tension spring 164, which is secured at its upper end to lever 156 and at its lower end to cross-member 4, as shown at 166 in Figure 9. Lever 156, at its right-hand end, as viewed in Figures 5 and 6, is attached to slidable member 168, through connecting link 170. Member 168 reciprocates in a channel formed in support 172.

Referring specifically to Figure 8, the main drive to shaft 46 is transmitted from electric motor 174 through sprocket 176, chain 178 and sprocket 180, mounted on shaft 46. Fixed to the end of shaft 12, as best seen in Figure 8, is a crank arm 182 having connecting link 184 pivoted thereto at 186. Connecting link 184 is pivoted at 188 to member 190, rotatably mounted on shaft 192, and having ratchet pawl 194 mounted thereon. Ratchet pawl 194 engages ratchet teeth on ratchet wheel 196, said ratchet wheel 196 being fixedly secured to shaft 192.

As best seen in Figure 1, shaft 192 is journalled in brackets 198 and 200, and is provided with screw threads 202 along its length intermediate said brackets 198 and 200. Mounted above threaded shaft 192, as best seen in Figures 1 and 2, is a magazine 204 having a plurality of regenerated cellulose bands 206 therein.

Referring specifically to Figure 9, a bracket 208 is mounted on one cross member 4. Rotatably mounted in bracket 208 is a shaft 210, having ratchet wheel 212 mounted thereon. Also, rotatably mounted upon shaft 210, beneath ratchet wheel 212, is ratchet lever 214 having ratchet pawl 216 pivoted at one end, as shown at 218. Ratchet pawl 216 is held in engagement with ratchet wheel 212 by spring 220. Also mounted on shaft 210, below bracket 208, is an indexing wheel 221 having a plurality of apertures around the periphery thereof for the reception of containers, for a purpose to be hereinafter described. Rotation of ratchet wheel 212 is permitted in only one direction, due to the action of spring pressed detent 222. Pivoted to the opposite end of ratchet lever 214 from ratchet pawl 216 is one end of the connecting link 224 which is pivoted at its opposite end to a bracket 224a fixed to the rear edge of slide plate 70.

Secured to the front cross-member 4, as viewed in Figure 9, on the bottom thereof, are a pair of brackets 226 which serve as guides for a plurality of bottles 228 passing between said guides. Also secured to front cross-member 4 is bracket 230, having cam grooves 232 cut therein. Pivoted to slidable plate 70 are two levers 234 and 236, respectively, having rollers 238 engaging in cam grooves 232. Lever 234 engages slidable vacuum cup 82 by a pin and slot connection, as shown at 240, and lever 236 engages slidable vacuum cup 86 by a pin and slot connection, as shown at 242.

Referring specifically to Figure 10, the band feeding device is shown in detail. As previously described, hollow rod 106 is slidably mounted in sleeve 110 and has a rectangular grid 244 mounted on the right-hand end thereof, as viewed in Figure 10. Mounted on the right-hand end of the magazine, as viewed in Figure 10, is a half nut 246 which is slidably mounted in a support 248. Lever 250 is mounted on top of support 248 and serves to raise or lower half nut 246 so that it may be engaged (by hand) with screw threads 202 on shaft 192. Mounted in support 248 are two rods 252, as best seen in Figure 12, each having a compression spring 254 thereon, said rods and springs engaging movable band-compressing head 256, as shown in Figure 10. Stop member or band-compressing head 256 abuts against a plurality of bands 206 placed in the magazine, and it will be appreciated that the rotation of screw threaded shaft 192 will move half nut 246 to the left, as viewed in Figure 10, thus forcing the bands 206 in the magazine to the left, as viewed in Figure 10.

As best seen in Figures 10 and 11, bands 206 are retained between stop member or band-compressing head 256 and pins 258, 260, and 262. When member 168 is in the raised position, grid 244 is moved to the right, as viewed in Figure 10, and a single band is removed from the magazine by air pressure, due to the vacuum existing in hollow rod 106. Then, as rod 168 moves downwardly, the vacuum is released and the band which contacts the right-hand face of grid 244 (Fig. 10) is moved downwardly by rod 168.

Referring to Figures 13–25, a modified embodiment of the invention is shown in which bands are automatically cut from a continuous tube of banding material fed into the machine from a roll placed beside the machine in some convenient location.

Referring specifically to Figure 13, the device is shown mounted in a manner similar to the embodiment of Figures 1–12, above a conveyor 2.

As best in Figure 14, the device is mounted on a frame having members 264 lying longitudinally of the conveyor and members 266 lying transversely thereof.

As best seen in Figures 15 and 18, the lower frame members are provided with upstanding frame members 268 and 270 secured thereto. Mounted across frame members 268 and 270 are supports 272, 274 and 276.

Mounted on frame members 268 and 270 and support 272, are shaft hangers 278, in which is journalled shaft 280. Also supported from support 272 by shaft hangers 282 is shaft 284, these shafts 280 and 284 corresponding to and being driven in the same way as shafts 46 and 12 respectively above described.

Referring specifically to Figure 15, shaft 284 has a cam 286 mounted at the end thereof, said cam 286 engaging cam follower 288 on lever 290, said lever 290 being pivoted at its upper end to support 286 at 292, and pivoted at its lower end to vacuum slide valve 294 at 296. Connected to vacuum slide valve 294 are two vacuum lines 298 and 300. Vacuum line 300 may be connected to a conventional vacuum pump while vacuum line 294 is connected at its opposite end to fitting 302, as best shown in Figure 14.

Referring again to Figure 15, cam follower 288 is held in engagement with cam 286 by tension spring 304 which is attached at one end to lever 290, and at its opposite end to support 268.

Referring specifically to Figure 16, lever 306 is pivoted on shaft 280 and has a cam follower 308 mounted thereon which engages with cam 310 mounted on shaft 284. Lever 306 is pivoted at its lower end to adjustable connecting link 312 (Figs. 16 and 19), as shown at 314. Cam follower 308 is held in engagement with cam 310 by arm 316, having spring 318 connected to the end thereof, and being attached to support 268 at its opposite end.

As best seen in Figs. 18 and 19, a corresponding lever 320 is also pivotally supported by shaft 280 and also has a corresponding adjustable connecting link 322 pivoted to the lower end thereof at 324. Lever 320 is also provided with a cam follower 283, which engages cam 326 (Fig. 14). The cam follower is held in engagement with cam 326 by tension spring 328 (Fig. 19), connected between arm 330 and frame 270. As shown in Figure 19, adjustable connecting links 312 and 322 are pivoted to brackets 332 and 334, respectively, fixed to the opposite ends, respectively, of slidable plate 336.

Figure 21:
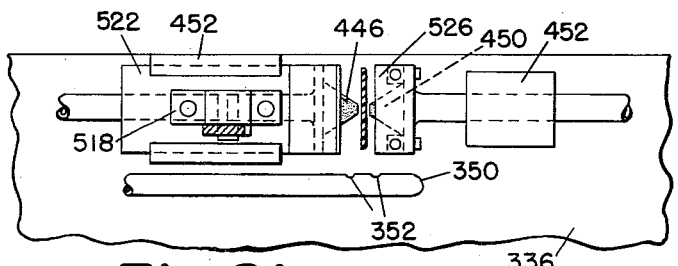

Referring again to Figure 16, a bracket 338 is mounted upon one of the cross-members 266 and supports a compressed air valve 340, said valve being actuated by cam 342 mounted on shaft 280, said cam 342 engaging cam follower 344. Suction line 346 (Fig. 10) may be connected to any convenient source of compressed air, and flexible line 348 (Fig. 10) is connected to tubing 350, having apertures 352 therein, as best seen in Figure 21.

Figure 20:
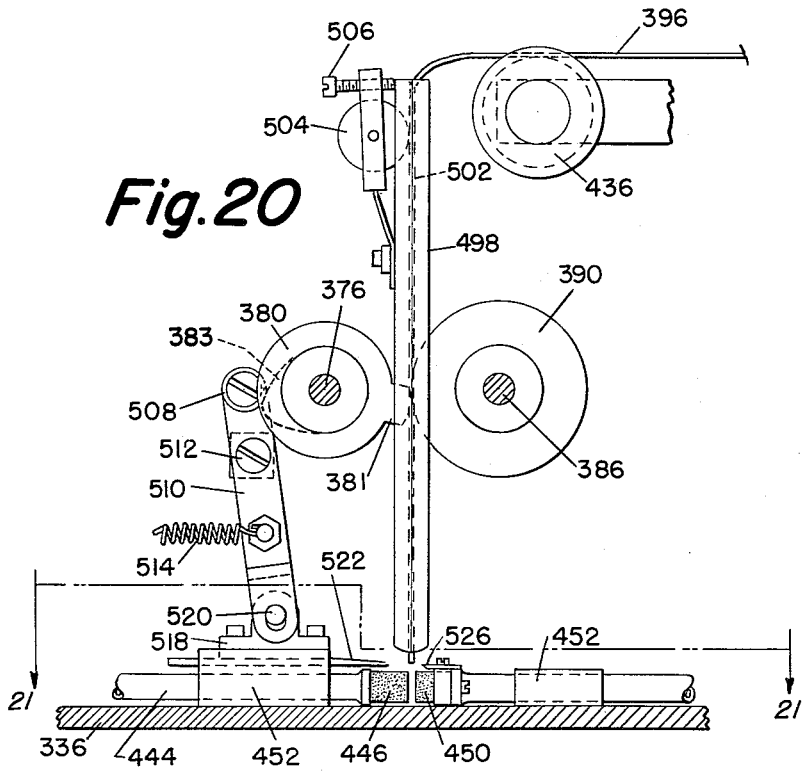
Figures 23, 24, 25:
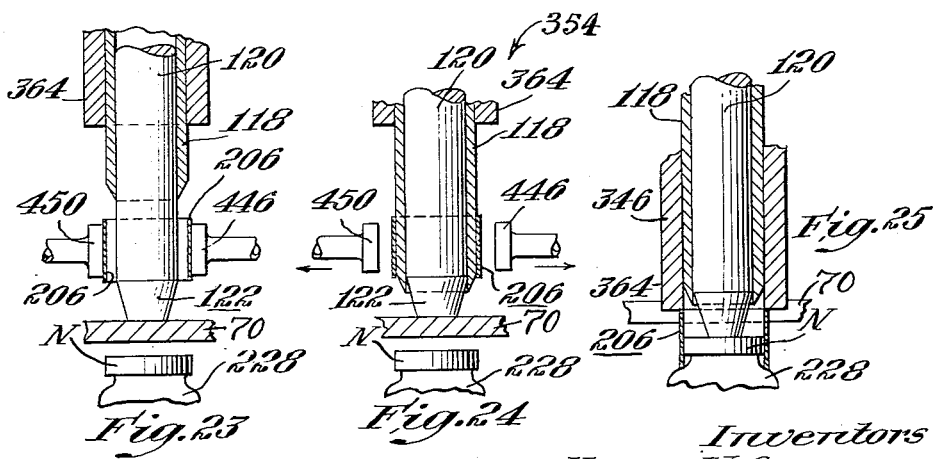
Fig. 23 is a diagrammatic fregmentary view simlar to Fig. 22, but omitting parts, showing the first step in transferring the band from the suction cups to the plunger assembly.
Fig. 24 is a view similar to Fig. 23, showing a further step in the operation wherein the suction cups have left the band on the expander sleeve.
Fig. 25 is another view generally similar to Fig. 23, but showing the stripper sleeve as it is positioned when the band has been completely removed from the expander sleeve and placed on the container.

Referring more specifically to Figs. 17 and 24, the transfer mechanism 354 is similar to that above described with reference to the construction shown in Figs. 1 to 12 inclusive, this transfer mechanism including the vertically movable plunger 116. The plunger is reciprocated by a lever 356 which is actuated by cam 358 mounted on shaft 280, said cam 358 engaging cam follower 360 mounted on lever 356. Cam follower 360 is kept in engagement with cam 358 by tension spring 362. Plunger 354 is formed in three parts in the same manner as the plunger of Figures 1–12, and outer sleeve 364 (corresponding to sleeve 126 above described) (Fig. 23) is reciprocated by forked lever 366 (Fig. 17), having cam follower 368 thereon which engages with cam 370 mounted on shaft 284. Also mounted on shaft 284 is bevel gear 372 which meshes with bevel gear 374 mounted on shaft 376. Shaft 376 is journalled in supporting bracket 378. Also mounted on shaft 376 is a feed roller 380 (Figs. 17 and 20). Mounted adjacent bracket 378 (Fig. 17) is a gear 382 which meshes with a gear 384 (Fig. 14) mounted on shaft 386, said shaft 386 being freely rotatable in supporting bracket 388. Also mounted on shaft 386, adjacent gear 384, is a knurled roller 390 (Fig. 13).

As best seen in Figures 13, 14 and 18, a pair of gripping plates 392 and 394 are provided through which the continuous tube of banding material 396 passes. The lower gripping plate 392 is stationary and is secured to frame cross-member 274. The cooperating plate 394 may be reciprocated by lever 398 (Fig. 17), connected to it by connecting link 400 (Fig. 18). Mounted on lever 398 is a cam follower 402 which engages with cam 404 (Fig. 18) on shaft 280. Cam follower 402 is held in engagement with cam 404 by tension spring 406.

As best shown in Figures 13, 14 and 18, a roller 408 is mounted on the end of a reciprocable rod 410, said rod being connected to lever 412 through connecting link 414. Lever 412 has a cam follower 416 mounted thereon, which engages a cam 418 (Fig. 18) mounted on shaft 280. Cam follower 416 is held in engagement with cam 418 by tension spring 420. Mounted to the right of roller 408, as viewed in Figure 13, are gripping plates 422 and 424, said plate 422 being stationary and secured to cross-member 274 (Fig. 18) and said plate 424 (Fig. 13) being moved up and down by a connecting link 426, said connecting link 426 being pivoted to lever 428 (Fig. 14). Lever 428 has a cam follower 430 mounted thereon which engages with cam 432 mounted on shaft 280. Cam follower 430 is held in engagement with cam 432 by tension spring 434.

Referring to Figure 13, it will be seen that the continuous tube of banding material 396 is supported by three rollers 436 all of which are rotatably secured to cross-member 274.

Referring specifically to Figure 19, front cross-member 266 is provided with a pair of guides 438 between which bottles 228 pass. Vacuum fitting 302 (Figs. 14 and 16) has two flexible hoses 440 and 442 (Fig. 19), respectively, connected thereto, said flexible hose 440 engaging a reciprocable rod 444 (Fig. 20) having a Y connection thereon, said rod having vacuum cup 446 secured to the right-hand end thereof, as viewed in Figure 19. Flexible tube 442 is secured to reciprocable rod 448 (Figs. 19 and 20), having a Y connection thereon, and having vacuum cup 450 (Fig. 20) secured to the left-hand end thereof, as viewed in Figure 19. Rods 444 and 448 may reciprocate in brackets 452. Mounted on rods 444 and 448 respectively are collars 454 (Fig. 18), having pins 456 projecting into cam grooves 458 (Fig. 19), formed in brackets 460 and 462, respectively. Brackets 460 and 462 are mounted on the underside of supporting members 464 and 466, respectively. Also shown in Figure 19, bracket 468 is mounted on cross-member 266 and has vertical shaft 470 rotatably mounted therein, said shaft carrying the ratchet wheel 472 and indexing wheel 478. A ratchet lever 474 swings on the shaft 470 and has pivotally mounted thereon a pawl 476. Ratchet lever 474 is connected to slidable plate 336 by a link 480 whose forward end is pivoted to a bracket 480ª bolted to the rear edge of plate 336. Bracket 468 also supports detent 482.

Referring specifically to Figure 18, it will be seen that shaft 280 is driven from electric motor 484, through sprocket 486, chain 488 and sprocket 490.

Referring to Figure 16, it will be seen that shaft 284 is driven from shaft 280 by sprocket 492, chain 494 and sprocket 496.

Referring specifically to Figures 20 and 21, details of the feed mechanism are shown in which roller 380 is mounted adjacent member 498. Member 498 is provided with a slot 500 therein, as best seen in Figure 17, and a channel 502 through which the continuous tube of banding material 396 passes. At the top of member 498 is provided a presser roller 504 having adjustment screw 506 for varying the pressure on the roll of banding material 396. Roller 380 has a projection 381 formed integrally therewith, said projection extending into slot 500 and gripping the continuous tube of banding material 396 between projection 381 and knurled roller 390, which extends into a slot formed in member 498 on the right-hand side thereof, as viewed in Figure 20. Roller 380 is also provided with a cam 383 formed integrally therewith, which engages cam follower 508, formed on the end of lever 510, said lever being fulcrumed on pin 512. Cam follower 508 is held in engagement with cam 383 by tension spring 514 (Fig. 13), said tension spring being secured to lever 510 at one end, and to bracket 516 at its opposite end. Lever 510 is secured at its lower end (Fig. 20) to slide 518 mounted in bracket 452 carried by plate 336 at its lower end in a pin and slot connection, as shown at 520. Bracket 518 has a knife blade 522 mounted therein, said knife blade extending partially over vacuum cup 446, as shown at 524, and in the closed position engaging with corresponding knife blade 526, mounted on vacuum cup 450.

The operation of the embodiment of the invention disclosed in Figures 1–12 is as follows:

When the device is to be operated, a suitable vacuum pump, not shown, which is connected to vacuum line 26, will be turned on so that a vacuum will exist in line 26. Motor 174 is energized and, due to the driving connection between sprockets 176 and 180, through chain 178, shaft 46 will be rotated. Shaft 12 will also be rotated, due to the driving connection through sprockets 72 and 74 and chain 76. As shaft 12 rotates, cams 64 and 66, engaging cam followers 60 and 62, respectively, mounted on levers 56 and 58, respectively, cause slidable plate 70 to be reciprocated on frame member 6, due to connecting links 68 and 69 connecting slidable plate 70 with levers 56 and 58. As slidable plate 70 is moved toward the rear of the device, that is to say, upwardly as viewed in Figure 9, levers 234 and 236, which are pinned to plate 70, cause vacuum cups 82 and 86 to move away from each other, due to the action of rollers 238 on levers 234 and 236, riding in cam grooves 232 in bracket 230 affixed to cross-member 4. As vacuum cups 82 and 86 move away from each other, they will also be moved toward the rear of the device by the reciprocating motion of plate 70. Thus, as they move toward the rear of the device carrying the band with them, they also move away from each other and thus they open the band 206 which is interposed between the cups due to the vacuum which is at this time maintained at the vacuum cups.

As plate 70 moves toward the rear of the device, as viewed in Figure 9, ratchet lever 214, acting through connecting link 224, indexes ratchet pawl 216 around one notch of the ratchet wheel, thus rotating indexing wheel 221 clockwise a distance of 60°. On the return travel of the slidable plate 70, indexing wheel 221 and ratchet wheel 212 are prevented from turning counterclockwise as viewed in Figure 9, by detent 222, which engages with the teeth on ratchet wheel 212.

As shown in Figure 9, a plurality of bottles 228 are carried between guides 226 by the continuously moving conveyor 2. When a bottle is held in one of the apertures of indexing wheel 221, directly in line with the guides 226, it will be positioned directly beneath plunger mechanism 118, 120.

As previously pointed out, a cam 14 is mounted on the end of shaft 12 and engages cam follower 16 mounted on lever 18, said lever 18 being pinned at its upper end to supporting bracket 8, and at its lower end to slide valve 24. Slide valve 24 has a pair of vacuum hoses 26 and 28 connected thereto, said vacuum hose 28 being connected to vacuum line 78 extending across the front of the device, as shown in Figure 1. Vacuum lines 80 and 88 connect vacuum cups 82 and 86, respectively, to vacuum line 78. As shaft 12 rotates, it will actuate vacuum slide valve 24 in timed relationship to the reciprocation of slidable plate 70. Hence, during the time that a band 206 is placed between vacuum cups 82 and 86, and during the time that plate 70 moves to the rear, as viewed in Figure 9, as the band is opened, a vacuum exists in line 78, due to the action of slide valve 24. Upon the return stroke of plate 70, i. e., when it moves to the front, as viewed in Figure 9, no vacuum exists in line 78, and consequently, none exists in vacuum cups 82 and 86.

As previously described, the parts 118 and 120 of the transfer mechanism are reciprocated by the cam 150 mounted on the shaft 46, said cam engaging a cam follower 148 on the lever 142; the parts 118 and 120 being reciprocated in timed relationship to the motion of the carrier plate 70. Hence, when the plate 70 is moved to the left from the position shown in Fig. 9, carrying with it a band 206 held between the vacuum cups 82 and 86, the band will be opened before it reaches the transfer position at which it will be centered over a bottle held in stationary position by the indexing wheel 221.

In this position of the plunger assembly, the tapered end 122 of rod 120 has entered the partially open band 206 and its lower end and is resting upon the upper surface of the slidable plate 70. After the lower end of the rod 120 has contacted the plate 70, the expander sleeve 118 continues to descend, the compression spring 124 permitting such relative movement of the sleeve 118 and the rod 120. As the sleeve 118 enters the band it fully expands the latter to substantially exact circular contour. While the band is in this position, the suction is released at the cups 450 and 446 (Figs. 23 and 24), and then the plunger assembly rises slightly, carrying the expanded band on the expander sleeve 118 while the slidable plate 70 moves forwardly and thus exposes the container 128 in position for the reception of the band. The plunger assembly now moves down until the rod 120 contacts the top of the container 128, the parts now being positioned as shown in Fig. 24. The stripper sleeve 364 now moves downwardly, sliding the band from off the expander sleeve 118 and over the top of the container, as shown in Fig. 25, due to the action of cam 138 mounted on shaft 12, engaging cam follower 136 on lever 130. The parts will then occupy the position shown in Figure 6. In this position, it will be noted that band 206 has been slipped off of sleeve 118 onto bottle 228, by the downward movement of sleeve 126 (Fig. 5).

As shown in Figure 9, on each cycle of the machine a different bottle is forced into the succeeding aperture of the indexing wheel 221, and after indexing wheel 221 is rotated 60° during each cycle of the machine, the bottles are discharged by the rotation of the indexing wheel.

Referring to Figure 5, as shaft 12 rotates, gear 90, engaging with gear 92, causes shaft 94, having cam 98 thereon, to rotate. Cam 98 engages cam follower 100 on lever 102, said lever 102 causing hollow rod 106 to reciprocate from left to right, as viewed in Figure 1. Hollow rod 106 is biased toward the right, as viewed in Figure 1, by compression spring 112. As best shown in Figures 2 and 4, a vacuum exists in hollow rod 106 during a portion of each cycle of the machine, due to the action of slide valve 32, which is operated by lever 36, connected to slide valve 32 by connecting link 38, said lever 36 having a cam follower 42 engaging with cam 44, mounted on shaft 46. Hence, during a portion of each cycle of the machine, rod 106 is connected to vacuum hose 26, through slide valve 32 and vacuum hose 34. Vacuum exists in rod 106 during the time that the low side of cam 98 engages cam follower 100 (Fig. 1).

Referring to Figure 10, it will be seen that when the low side of cam 98 engages cam follower 100, rod 106 will shift to the right, as viewed in Figure 1, and will move to the right a sufficient distance to engage the first band in the series of bands in the magazine 204. When cam 98 has rotated a sufficient number of degrees so that the high side of the cam engages cam follower 100, the parts will appear as they do in Figure 10. In this position, vacuum no longer exists in rod 106 since valve 32 has been closed. Member 168 has been moved downwardly by the action of lever 156 connected to member 168 through connecting link 170. Lever 156 is actuated by cam 162, mounted on shaft 46, engaging cam follower 160. As member 168 moves downwardly, as shown in Figure 10, it slides a band 206 off of grid 244 formed over the end of rod 106, since vacuum no longer exists in rod 106. Member 168 carries the band 206 downwardly and places it between vacuum cups 82 and 86. It will be appreciated, of course, that the vacuum cups 82 and 86 will be in the forward position, as viewed in Figure 9, and will have sufficient distance between them to permit the interposition of a band therebetween. As soon as the band has been placed between vacuum cups 82 and 86, another cycle of the machine begins and vacuum line 78 is again connected to the vacuum pump by the action of valve 24, and vacuum cups 82 and 86 carried by the plate 70 begin to move to the rear carrying the band to the transfer position while at the same time opening the band.

As shown in Figures 10, 11 and 12, a plurality of bands 206 are held in the magazine 204 and abut three pins 258, 260 and 262 on the left-hand side of the magazine, as viewed in Figure 10. The bands are urged to the left by the action of half nut 246 engaging screw threaded shaft 192. As shown in Figure 8, lever 182, mounted on shaft 12, causes connecting link 184 to move ratchet pawl 194 around ratchet wheel 196 one notch during each cycle of the machine. Hence, the intermittent rotation of ratchet wheel 196 causes the intermittent rotation of shaft 192, and causes half nut 246 to be moved to the left, as viewed in Figure 10, thus compensating for the band that is removed from the magazine during each cycle of the machine. When it is desired to reload the magazine, all that is necessary is to raise locking lever 250 to the dotted line position, as shown in Figure 10, and slide half nut 246, rods 252, springs 254 and stop member 256 to the right, as viewed in Figures 10 and 12.

Thus, it will be appreciated, that during each cycle of the machine, a bottle 228 is centered under the transfer mechanism comprising parts 118, 120 and is held by indexing wheel 221. The vacuum cups 82 and 86 center and open band 206 over the bottle, said band having been removed from the magazine 204 by the vacuum grid 244 and reciprocating member 168. The parts 118, 120 move downwardly and the band is slipped from the expander sleeve 118 by the stripper sleeve 126 onto bottle 228.

The operation of the embodiment of the invention disclosed in Figures 13–21 is generally similar to that disclosed in the embodiment of Figures 1–12, except that a continuous tube of banding material is fed into the machine and is automatically cut to the desired length.

As best seen in Figures 16 and 19, slidable plate 336 is reciprocated by the action of cams 310 and 326, mounted on cross shaft 284, engaging their respective cam followers, mounted on levers 306 and 320, said levers 306 and 320 being rotatably mounted on shaft 280. As levers 306 and 320 reciprocate slidable plate 336, due to the connection therewith through links 312 and 322, the vacuum cups 446 and 450, slidably mounted on slidable plate 336, are caused to move away from each other, by the action of the pins 456 mounted on the collars 454, which engage the cam grooves 458 in fixed brackets 460 and 462, respectively, being mounted on frame members 464 and 466, respectively.

During each cycle of the machine and just prior to the feeding of the tube of banding material to the vacuum cups 446, 450, compressed air valve 340 is actuated by cam 342 mounted on shaft 280, said cam 342 engaging cam follower 344 mounted on the actuating lever of valve 340 (see Fig. 13). The operation of the air valve 340 provides a flow of air through flexible hose 348 and pipe 350 (Fig. 19) which, adjacent its terminus, has openings 352 directed towards the vacuum cups 446, 450 (see Fig. 21). The air blast from pipe 350 removes any band remaining in the vicinity of vacuum cups 446, 450 due to a failure of the band to transfer to the plunger mechanism 118, 120.

Figure 22:
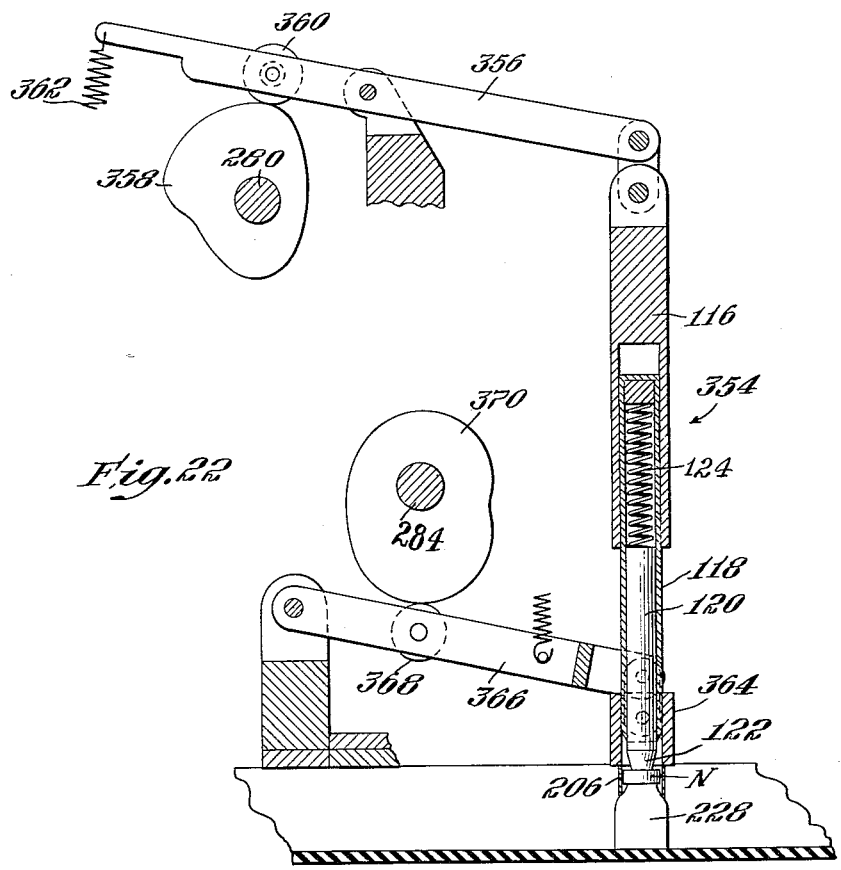
Fig. 22 is a diagrammatic fragmentary vertical section to much larger scale than Fig. 6, showing the plunger assembly for use in slipping the band onto the neck of the bottle, the parts being in relative positions which they occupy at the completion of the slipping of the band onto the container.

Referring to Figs. 17 and 22, the transfer assembly 354 is identical in its operation with that disclosed in the embodiment illustrated in Figs. 1 to 12 inclusive, the stripper sleeve 364 of the transfer assembly being actuated by the cam 370 which engages a cam follower 368 on the lever 366 while the rod 120 is actuated by the lever 356 carrying the cam follower 360 which engages the cam 358 mounted on the shaft 280.

Mounted on shaft 284 is bevel gear 372 engaging with bevel gear 374 mounted on shaft 376. As shaft 376 rotates, roller feed member 380, as best shown in Figure 20, is rotated and during each revolution thereof projecting member 381 engages the continuous tube of banding material 396 between said projections 381 and knurled wheel 390.

Knurled wheel 390 is mounted on shaft 386. A positive drive is provided between shafts 376 and 386 by meshing gears 382 and 384 (Fig. 14). Thus, during each cycle of the machine, the rotation of roller feed member 380 and knurled wheel 390 will move a section of tubular banding material of exactly the desired axial length between separated vacuum cups 446 and 450, and when the banding material has become properly positioned between said cups, the further rotation of roller feed member 380, having cam 383 formed integrally therewith, moves knife blade 522 to the right, as viewed in Figure 20, due to the action of cam follower 508 engaging cam 383 and moving bracket 518 to the right, carrying knife blade 522 therewith, due to the pin and slot connection between lever 510 and bracket 518, as shown at 520. Knife blade 522, in cooperation with blade 526, will cut a band of material of the desired axial length from the continuous tube and the band will then be moved into transfer position over a bottle by vacuum cups 446 and 450.

Referring to Figures 13, 14, 18 and 20, a roller 408 is located over the incoming tube of banding material. Roller 408 is reciprocated by the action of lever 412. The purpose of the reciprocating roller 408 is to form a slack loop in the incoming tube of banding material so that it will easily pass between the feed rollers. When roller 408 is moved downwardly, gripping jaws 292 and 294 are clamped together by the action of lever 398, link 400, cam follower 402 and the cam 404 on shaft 280. Gripping jaws 422 and 424 will be spaced apart when roller 408 is moved downwardly. As the feed rollers 380 and 390 start to move an increment of tubular banding material through the channel 502 in member 498, gripping jaws 392 and 394 will be opened and jaws 422 and 424 will be closed in order to prevent the tubular banding material from backing out of the machine. Thus it is apparent that there is practically no resistance offered to the action of the feeding rollers, since a slack loop has been placed in the tubular banding material by roller 408, and the banding material is securely held on the other side of the loop from the feeding rollers by gripping jaws 422 and 424. Movable jaw 424 is actuated by lever 428, having cam follower 430 engaging cam 432. The tubular banding material is supported by three rollers 436, mounted on the front of the machine, as shown in Figure 13.

Referring to Figure 19, the operation of the indexing mechanism is identical with that of Figures 1–12. Hence, as movable plate 336 moves to the rear, as viewed in Figure 19, a band will be opened and centered over the bottle 228 held in the indexing wheel. During each cycle of the machine, the indexing wheel 478 is rotated 60°, due to the action of connecting link 480, lever 474, ratchet pawl 476 and ratchet wheel 472, said ratchet wheel 472 being mounted on the same shaft as indexing wheel 478. It will also be noted that movable plate 336 is continuously biased toward the front of the machine, as viewed in Figure 19, by tension springs 318 and 328.

The entire machine is driven by electric motor 484, driving shaft 280 through sprocket 486, chain 488 and sprocket 490. Shaft 284 is driven from shaft 280 by sprocket 492, chain 494 and sprocket 496.

Thus it is obvious that during each cycle of the modified embodiment of the machine, an increment of tubular banding material of the desired width will be fed between knife blades 522 and 526 and will be cut off by said knife blades. Said band will then be moved by vacuum cups 446 and 450 to the rear of the machine, as viewed in Figures 14 and 19, where it will be centered over a bottle held in band-receiving position by the indexing wheel 478 and beneath the transfer assembly 354. As the parts of the transfer assembly move downwardly, the rod 120 first passes through the band held by the suction cups, and then the expander sleeve enters the band and fully expands the latter, whereupon the vacuum cups retreat and the band is slipped down onto the bottle neck by the action of the stripper sleeve 364, the banded bottle then being moved away from the banding position and another bottle being placed in band-receiving position at the commencement of the next cycle of operations.

Although the banding material used with the two embodiments of this invention, specifically disclosed, is either precut lengths of wet regenerated cellulose or a continuous tube of wet regenerated cellulose, it is obvious that other types of banding material could also be employed and other suitable types of such material are also included within the scope of this invention.

From the foregoing description, it is obvious that the device of this invention performs a tedious, repetitious operation with great speed and accuracy, and with a minimum of mechanical parts. It will be appreciated by those skilled in the art that many modifications may be made within the scope of the invention, and the invention is to be restricted only in accordance with the appended claims.

What is claimed is:

1. A device for applying bands to containers comprising a framework adapted to be mounted above a conveyor, a carrier slide mounted on said framework for reciprocation in a horizontal plane, movable knife means carried by said slide, vacuum means for opening a band, said vacuum means comprising oppositely movable vacuum cups carried by said slide, the vacuum cups being below the plane of operation of the movable knife means, band-feeding means mounted on the framework and adapted to feed a continuous band of banding material into the field of action of said knife means and between the vacuum cups, transfer means mounted on said framework, remote from said band-feeding means, adapted to transfer a band from said vacuum means to a container positioned below the transfer means, and means to reciprocate the carrier slide thereby, alternatively, to position the vacuum cups in operative relation to the band-feeding means and to the transfer means, respectively.

2. A device for applying bands to containers comprising a framework adapted to be mounted above a conveyor, a carrier slide mounted on said framework for reciprocation in a horizontal plane, movable knife means mounted on said slide, vacuum means for opening a band, said vacuum means comprising oppositely movable vacuum cups carried by the slide and located below the plane of operation of the knife means, band-feeding means mounted on the framework and adapted to feed a continuous length of tubular banding material into the field of action of said knife means and in position to be engaged by the vacuum means, transfer means mounted on said framework, remote from said band-feeding means, adapted to transfer a band from said vacuum means to a container positioned below the transfer means, the transfer means comprising a rigid, band-expanding sleeve adapted to receive a band from the vacuum means, a stripper sleeve slidable on the band-expander sleeve adapted to transfer a band from the band-expander sleeve to a container, and means to reciprocate the carrier slide so as, alternatively, to position the vacuum means in operative relation to the band-feeding means or to the transfer means respectively.

3. A device for applying bands to containers comprising a framework adapted to be mounted above a conveyor, a carrier slide mounted on said framework for reciprocation in a horizontal plane, knife means mounted on said carrier slide, means for opening a band, said band-opening means also being carried by the slide and being located below the plane of movement of the knife means, band-feeding means mounted on the framework and adapted to feed a continuous tube of banding material to said band-opening means and into the field of action of the knife means, transfer means, mounted on said framework remote, from the band-feeding means, adapted to transfer a band from the band-opening means to a container positioned below the transfer means, the transfer means comprising a rigid, band-expanding sleeve having an uninterrupted circular outer periphery adapted to enter a band held by the band-opening means, a stripper sleeve slidable on the band-expander sleeve and which is operative to transfer a band from the expander sleeve to a container, and means to reciprocate the carrier slide so as alternately to position the vacuum means in operative relation to the band-feeding means and to the transfer means, respectively.

4. A device for applying bands to containers comprising a frame, a carrier slide mounted on the frame for reciprocation in a horizontal plane, band-severing means comprising a movable part carried by the slide, vacuum means for opening a band, said vacuum means being also mounted on the slide and below the plane of movement of the movable severing means, band-feeding means mounted on the frame and which is operative to feed a continuous length of tubular banding material to said vacuum means and into the field of action of the band-severing means, transfer means, mounted on the frame, remote from the band-feeding means, operative to transfer the band from the vacuum means to a container positioned below the transfer means, the transfer means comprising a band-expanding sleeve adapted to enter a band held by the vacuum means, a stripper sleeve slidable on the expander sleeve and which is operative to transfer a band from the expander sleeve to a container, and a rigid rod slidable within the expander sleeve, said rod having a tapered end, and means to reciprocate the carrier slide so as alternately to position the vacuum means in operative relation to the band-feeding means and to the transfer means, respectively.

5. A device for applying bands to containers comprising a frame, a carrier slide mounted on the frame for reciprocation in a horizontal plane, means for reciprocating the slide, band-severing means carried by the slide, vacuum means for opening a band also carried by the slide, band-feeding means mounted on the frame and adapted to feed a continuous length of tubular banding material into the fields of action of the vacuum means and the band-severing means, transfer means mounted on the frame, remote from the band-feeding means, adapted to transfer a band from the vacuum means to a container positioned below the transfer means, the transfer means comprising a band-expanding sleeve adapted to enter a band held by the vacuum means, a stripper sleeve slidable on the expander sleeve and operative to transfer a band from the expander sleeve to a container, a rod slidable within the band-expander sleeve, the rod having a tapered end portion, a spring urging said rod to project downwardly below the band-expander sleeve, said rod having a flat lower end surface adapted to engage a container, the carrier slide being moved back and forth during each cycle of the machine so as alternately to position the vacuum means in operative relation to the band-feeding means or to the transfer means, respectively.

6. A device for applying bands to containers comprising a frame, a carrier slide mounted on the frame for reciprocation in a horizontal plane, means carried by the slide for severing band-forming material, vacuum means for opening a band, said vacuum means comprising oppositely movable vacuum cups carried by the slide, band-feeding means mounted on the frame and operative to feed a continuous length of tubular banding material into the fields of action of the vacuum means and band-severing means, guide means for said length of banding material arranged above the vacuum means and which is operative to restrict horizontal movement of the banding material, transfer means mounted on the frame remote from the band-feeding means and which is operative to transfer a severed length of the banding material from the vacuum means to a container positioned below the transfer means, and means to operate the carrier slide so as alternately to position the vacuum means in operative relative to the band-feeding means or the transfer means, respectively.

7. A device for applying bands to containers comprising a framework adapted to be mounted above a conveyor, a carrier slide mounted on said framework for reciprocation in a horizontal plane, knife means mounted on said slide, vacuum means on said slide, below said knife means, for opening a band, band-feeding means mounted on said framework and adapted to feed a continuous tube of banding material to said vacuum means and said knife means in uniform successive increments, transfer means mounted on said framework, remote from said band-feeding means, adapted to receive a band from said vacuum means and apply it to a container positioned below said transfer means, means to reciprocate said carrier slide to successively position the vacuum means under said band-feeding means and said transfer means, and means to direct a jet of air toward said vacuum means during each cycle of operation to remove obstructions prior to the operation of said band-feeding means.

8. In apparatus for applying seamless open-ended bands to bottle tops, in combination, means for holding a supply of flattened tubular banding material, means for drawing off from said supply a length of the flattened material sufficient to constitute a single band of the desired axial length, relatively movable parts engageable with opposite sides of said length of material, said parts constituting means operative to grip the band-forming length so drawn off, means for severing said band-forming length from the supply while it is held between said parts, means for holding a bottle stationary in band-receiving position, means for moving the band-gripping means relatively to the bottle in a path perpendicular to the axis of the bottle to dispose said severed band-forming length of material above the bottle, means for conforming the severed band-forming length to substantially exact circular contour and for holding it in substantially coaxial relation to the bottle neck, and means for applying force to the circular band to move the latter in an axial direction and thereby slip it over the bottle neck.

9. Apparatus according to claim 8, further characterized in that the means for gripping the band-forming length of material is constructed and arranged partially to open the severed length of material while carrying it to a position above the bottle.

10. Apparatus according to claim 8, further characterized in that the means for gripping the length of band-forming material comprises two relatively movable suction cups, means for moving the cups bodily from a band-receiving position to a band-delivering position, and means for separating the cups during such movement thereby partially to open the band.

11. In apparatus for applying seamless open-ended bands to bottle tops, in combination, means for measuring off a predetermined length of flattened tubular band-forming material, from a supply, sufficient to form a single band, relatively movable vacuum cups engageable with opposite sides of the flattened tubular material, means for establishing sub-atmospheric pressure at the cups, whereby the cups grip the band-forming material, means for cutting off said predetermined length from the supply while the cups continue to grip the material by suction action, means for moving the cups bodily and simultaneously toward a transfer position while separating the cups, thereby partially to open the band-forming material, means operative to shape the severed length of band-forming material to substantially exact circular contour, and means for applying force to the circular band to move the latter in an axial direction thereby to slip it onto the neck of a bottle.

12. In apparatus for applying seamless open-ended bands to bottle necks, in combination, means for holding a bottle stationary in band-receiving position, carrier means operative to hold a partially open band above a bottle neck, means including a rigid circular sleeve, of an axial length exceeding that of the band, for conforming the entire length of the band to substantially exact circular contour, and means for applying force to the circular band to move the latter in an axial direction from off the sleeve and onto the bottle neck.

13. Apparatus according to claim 11, further characterized in that the means for disposing the partially open band above the bottle comprises a pair of relatively movable suction cups, and means for breaking the suction at said cups and for thereafter moving them away from the fully open band prior to the slipping of the latter onto the bottle neck.

14. Apparatus according to claim 12, further characterized in having means for severing the end portion from a length of tubular band-forming material while said end portion is engaged by the carrier means, and means so actuating the carrier means as partially to open the severed length of material while moving the latter to a position above the bottle neck.

15. In apparatus for applying seamless open-ended bands to bottle tops, in combination, means for supporting a bottle in band-receiving position, means for disposing a partially open band above the bottle neck, a rigid, axially movable, tubular, cylindrical band-expander coaxial with the neck of a bottle supported in the band-receiving position, means for moving the expander into the band thereby to impart a substantially exact circular shape to the band, and means for applying force to the circular band to move the latter in an axial direction while slipping it from the expander onto the bottle neck.

16. In apparatus for applying seamless open-ended bands to bottle necks, in combination, means for holding a bottle stationary in band-receiving position, means for disposing a partially open band above the bottle neck, an axially movable, tubular, cylindrical expander sleeve coaxial with the neck of a bottle disposed in band-receiving position, a resiliently yieldable rod slidable within the expander sleeve, means for moving the rod downwardly through the partially open band, means to cause the expander sleeve to enter the partially open band and thereby conform the latter to a substantially exact circular contour, and a stripper sleeve movable longitudinally of the expander sleeve which is operative to slide the open band from off the expander sleeve and onto the bottle neck.

17. Apparatus for applying seamless open-ended bands to bottle necks comprising, in combination, supply means for measuring off from a length of band-forming tubing a piece sufficient to form a single band, reciprocable carrier means for moving said piece to a transfer station while partially opening it, means for holding a bottle stationary at the transfer station, means for conforming the band to substantially exact circular contour, a rigid cylindrical stripper sleeve for moving the open band in an axial direction onto the bottle neck, and means for actuating the several parts in timed relation, the actuating means being so constructed and arranged that while one band is being moved axially onto the neck of the bottle, the carrier means is returning toward the supply.

References Cited in the file of this patent

UNITED STATES PATENTS

| | | |
|---|---|---|
| 1,835,336 | Risser | Dec. 8, 1931 |
| 2,079,326 | Levy et al. | May 4, 1937 |
| 2,089,769 | Strout | Aug. 10, 1937 |
| 2,579,458 | Allen et al. | Dec. 25, 1951 |
| 2,623,673 | Holstein | Dec. 30, 1952 |